(12) United States Patent
Chen et al.

(10) Patent No.: US 10,875,113 B2
(45) Date of Patent: Dec. 29, 2020

(54) POT BROACHING TOOLS AND METHODS FOR REMANUFACTURE-FORMING POT BROACHING TOOLS

(71) Applicant: EST Tools Co., Ltd., Haiyan (CN)

(72) Inventors: Errong Chen, Haiyan (CN); Ziyan Chen, Haiyan (CN); Mingfeng Pan, Haiyan (CN)

(73) Assignee: EST Tools Co., Ltd., Haiyan (CN)

( * ) Notice: Subject to any disclaimer, the term of this patent is extended or adjusted under 35 U.S.C. 154(b) by 0 days.

(21) Appl. No.: 16/848,075

(22) Filed: Apr. 14, 2020

(65) Prior Publication Data

US 2020/0238410 A1 Jul. 30, 2020

Related U.S. Application Data

(62) Division of application No. 16/215,771, filed on Dec. 11, 2018, now abandoned.

(51) Int. Cl.
*B23P 6/00* (2006.01)
*B23F 1/08* (2006.01)

(52) U.S. Cl.
CPC .............. *B23F 1/086* (2013.01); *B23P 6/00* (2013.01)

(58) Field of Classification Search
CPC .................................. B23P 6/00; B23F 1/086
See application file for complete search history.

(56) References Cited

U.S. PATENT DOCUMENTS

| | | | | |
|---|---|---|---|---|
| 1,443,058 A | * | 1/1923 | Taylor | B23D 43/02 407/15 |
| 1,909,840 A | * | 5/1933 | Muller | B23F 1/086 409/59 |
| 3,626,563 A | * | 12/1971 | Lehto et al. | B23F 21/268 407/14 |
| 4,041,590 A | * | 8/1977 | Schibrowski | B23D 43/04 407/15 |
| 5,215,414 A | * | 6/1993 | Roseliep | B23D 43/02 407/14 |

* cited by examiner

*Primary Examiner* — Jermie E Cozart
(74) *Attorney, Agent, or Firm* — Burris Law, PLLC

(57) ABSTRACT

A method for remanufacturing a pot broaching tool includes re-grinding cutting teeth on a cutting side of a used pot broaching tool, cool laser welding a rough milled shim to a bottom side of the used pot broaching tool, and grinding the cool laser welded rough milled shim such that an outer surface of the cool laser welded milled shim has a high polished surface. An inner surface of the rough milled shim has an Ra surface finish between 250 and 30 microinches and the ground outer surface of the rough milled shim has a flatness tolerance within +0/−0.0002 inches. Also, the method can include installing the remanufactured pot broaching tool in a pot without the use of a thin shim between the outer surface of the cool laser welded milled shim and an inner surface of the pot.

20 Claims, 6 Drawing Sheets

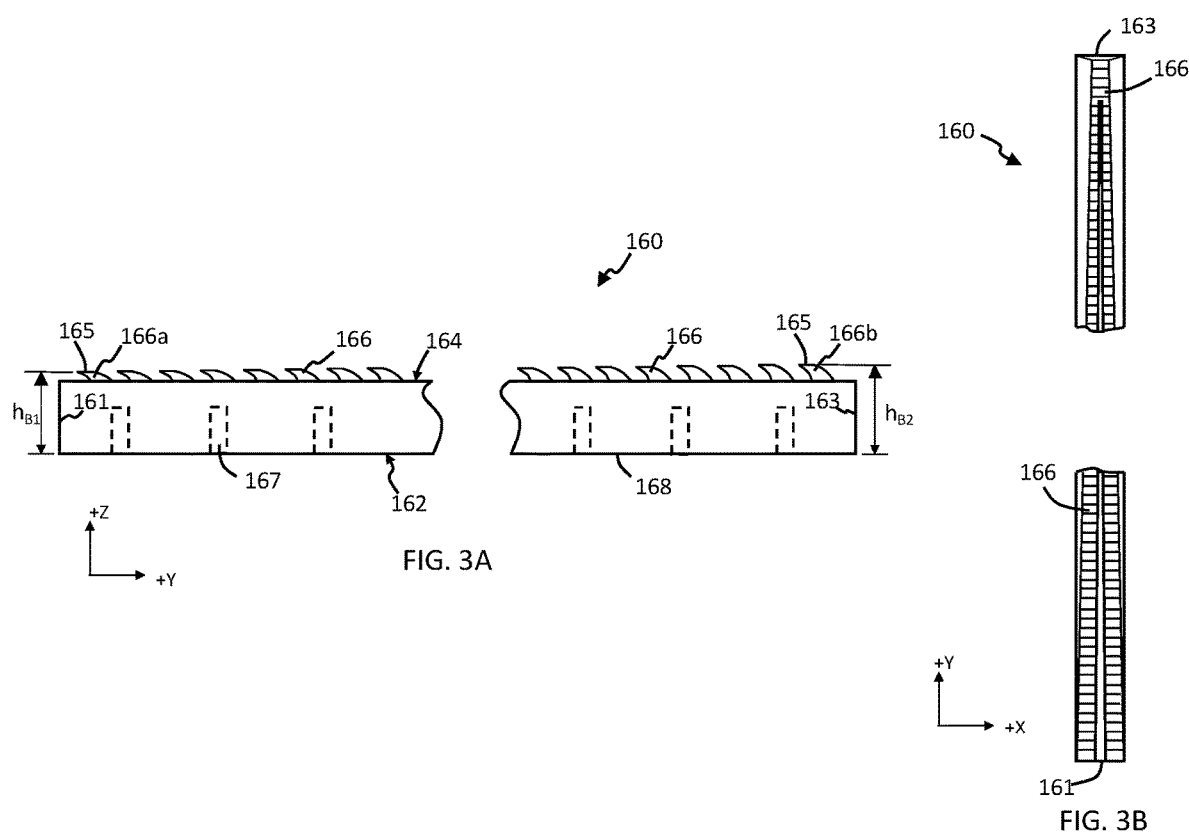

POT BROACHING TOOLS AND METHODS FOR REMANUFACTURE-FORMING POT BROACHING TOOLS

CROSS-REFERENCE TO RELATED APPLICATIONS

This application is a divisional of U.S. application Ser. No. 16/215,771, filed on Dec. 11, 2018. The disclosure of the above application is incorporated herein by reference.

FIELD

The present disclosure relates to pot broaching tools, and particularly, to remanufactured pot broaching tools with a milled shim cool laser welded thereto.

BACKGROUND

The statements in this section merely provide background information related to the present disclosure and may not constitute prior art.

Pot broaching machines with a set of pot broaching tools held within a cylindrical walled holder or "pot" are used to cut an outer diameter of a pre-formed part, e.g., a gear blank, in a time and cost-efficient manner. The pot broaching tools are typically held against the inner cylindrical wall of the pot with bolts or screws such that a hollow inner core bounded by cutting teeth of the pot broaching tools is provided. The pre-formed part has an outer diameter that is larger than an inner diameter of the hollow inner core. Accordingly, the cutting teeth of the pot broaching tools remove material from and forms features such as gear teeth at the outer diameter of the pre-formed part as it moves through the inner core. The pre-formed part may be moved through the length of the hollow inner core in a matter of seconds, thereby providing rapid production of formed parts such as gears for automotive transmissions.

The pot may include sixteen, thirty, or more pot broaching tools and the pot broaching tools must be replaced after the cutting teeth have experienced a given amount of wear. Replacing the pot broaching tools with remanufactured pot broaching tools rather than new pot broaching tools reduces cost. That is, remanufacturing a used pot broaching tool with remanufactured cutting teeth cost less than producing a new pot broaching tool. However, remanufacturing a pot broaching tool reduces its height and shims are generally required to provide the same inner diameter of the hollow inner core. Installing remanufactured pot broaching tools with shims can be a time consuming and costly process.

SUMMARY

In one form of the present disclosure, a method includes re-grinding cutting teeth on a cutting side of a used pot broaching tool, cool laser welding a rough milled shim to a bottom side of the used pot broaching tool, and grinding the cool laser welded rough milled shim such that an outer surface of the cool laser welded milled shim has a high polished surface and a remanufactured pot broaching tool is formed. In some variations, the ground outer surface of the rough milled shim has a flatness tolerance within +0/−0.0002 inches. In at least one variation, an inner surface of the rough milled shim has an Ra surface finish between 250 and 30 μin. Also, the ground rough milled shim can have a thickness between 0.0625 inches and 0.500 inches. In some variations the method further includes removing the used pot broaching tool from a pot of a pot broaching machine before forming the remanufactured pot broaching tool. In such variations the method can include installing the remanufactured pot broaching tool in the pot without the use of a thin shim between the outer surface of the cool laser welded rough milled shim and an inner surface of the pot.

In another form of the present disclosure, a method includes replacing a first set of pot broaching tools removed from a pot of a pot broaching machine with a second set of pot broaching tools. The second set of pot broaching tools comprise at least one remanufactured pot broaching tool and the at least one remanufactured pot broaching tool is formed by re-grinding cutting teeth on a cutting side of a used pot broaching tool, cool laser welding a rough milled shim to a bottom side of the used pot broaching tool, and grinding the cool laser welded rough milled shim such that an outer surface of the cool laser welded milled shim has a high polished surface. In some variations the ground outer surface of the rough milled shim has a flatness tolerance within +0/−0.0002 inches. And in at least one variation an inner surface of the rough milled shim has an Ra surface finish between 250 and 30 μin. Also, the ground rough milled shim can have a thickness between 0.0625 inches and 0.500 inches. In some variations the at least one remanufactured pot broaching tool is installed in the pot without the use of a thin shim between the outer surface of the cool laser welded milled shim and an inner surface of the pot.

In at least one variation the first set of pot broaching tools comprises a set of used pot broaching tools. In such variations, each of the set of used pot broaching tools can be formed into a remanufactured pot broaching tool by re-grinding cutting teeth on a cutting side of a used pot broaching tool, cool laser welding a rough milled shim to a bottom side of the used pot broaching tool, and grinding the cool laser welded rough milled shim such that an outer surface of the cool laser welded milled shim has a high polished surface such that a set of remanufactured pot broaching tools is formed. Also, each of the set of remanufactured pot broaching tools can be installed in the pot without the use of a thin shim between the outer surface of the cool laser welded milled shim and an inner surface of the pot.

In still another form of the present disclosure, a method for replacing pot broaching tools in a pot broaching machine includes removing a pot containing a set of broaching tools from a pot broaching machine and replacing a first set of pot broaching tools from the pot with a second set of pot broaching tools. The second set of pot broaching tools include at least one remanufactured pot broaching tool and the at least one remanufactured pot broaching tool is formed by re-grinding cutting teeth on a cutting side of the pot broaching tool, cool laser welding a rough milled shim to a bottom side of the pot broaching tool, and grinding the cool laser welded rough milled shim such that an outer surface of the cool laser welded milled shim has a high polished surface. The method also includes re-installing the pot into the pot broaching machine. In some variations the at least one remanufactured pot broaching tool is installed within the pot without the use of a thin shim between the rough milled shim cool laser welded to the bottom side of the pot broaching tool and an inner surface of the pot.

In at least one variation the at least one remanufactured pot broaching tool comprises a set of remanufactured pot broaching tools and the set of remanufactured pot broaching tools are installed within the pot without the use of thin shims between the rough milled shims cool laser welded to the bottom sides of the set of pot broaching tools and an inner surface of the pot. In such a variation, a time to replace the first set of pot broaching tools with the second set of pot broaching tools using the set of remanufactured pot broaching tools without the use of thins shims is reduced by at least 50% compared to replacing the first set of pot broaching tools with remanufactured pot broaching tools and thin shims between the remanufactured pot broaching tools and the inner surface of the pot.

In some variations the at least one remanufactured pot broaching tool has a tolerance of a height dimension between an outer surface of the set of cutting teeth and an elongated outer surface of the cool laser welded rough milled shim within +0/−0.0002 inches. And in at least one variation, the rough milled shim comprises a milled inner surface in contact with the bottom side of the elongated bar.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3A is a schematic side view of a pot broaching tool before being used in a pot broaching machine;

FIG. 3B is a schematic top view of the pot broaching tool in FIG. 3A;

Figures 1, 1A, 1B:
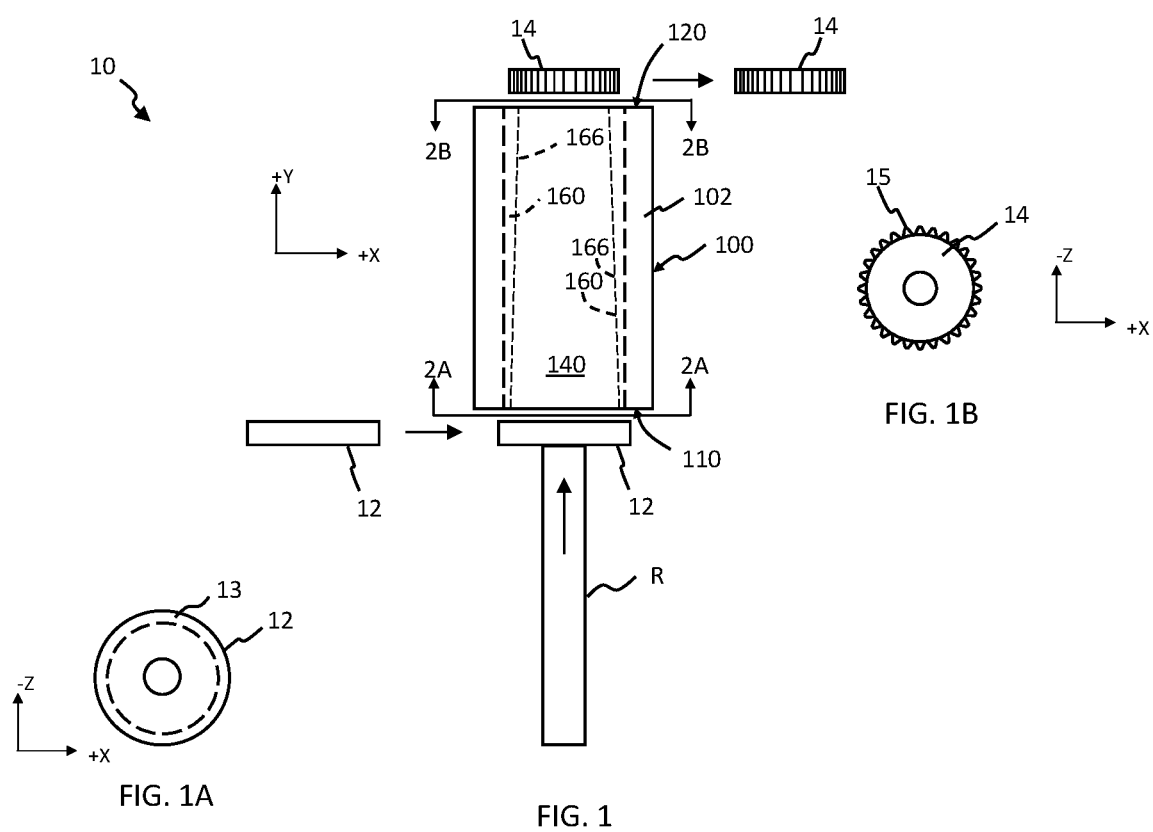
FIG. 1 is a schematic side view of a pot broaching machine in accordance with the teachings of the present disclosure.
FIG. 1A is a schematic top view of a pre-formed part before passing through the pot broaching machine in FIG. 1.
FIG. 1B is a schematic top view of the pre-formed part in FIG. 1A after passing through the pot broaching machine in FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a schematic side view of a pot broaching machine 10 is shown. The pot broaching machine includes a pot 100 with a set of pot broaching tools 160 (only two shown in FIG. 1) attached to a cylindrical wall 102 of the pot 100 as described in greater detail below. Cutting teeth 166 (shown in greater detail in FIGS. 2A-2B) of the set of pot broaching tools 160 bound a hollow inner core 140 that extends along a length (Y direction) of the pot 100. In operation, a pre-formed part 12 is positioned at a first end 110, e.g., a lower (−Y direction) end, of the pot 100 and a ram R moves the pre-formed part 12 through the inner core 140 to a second end 120, e.g., an upper (+Y direction) end, of the pot 100 such that a formed part 14 (e.g., a gear) with features 15 (e.g., gear teeth) is formed. FIG. 1A schematically depicts a top view (−Y direction) of the pre-formed part 12 and FIG. 1B schematically depicts a top view of the formed part 14. The cutting teeth 166 of the set of pot broaching tools 160 cut and remove material from an outer diameter portion 13 of the pre-formed part 12 as it moves through the inner core 140 from the first end 110 to the second end 120 of the pot 100. While the formed part 14 is schematically depicted as a gear in FIG. 1, it should be understood that other shapes and/or other types of parts may be formed using the pot broaching machine 10.

Figures 2A, 2B:
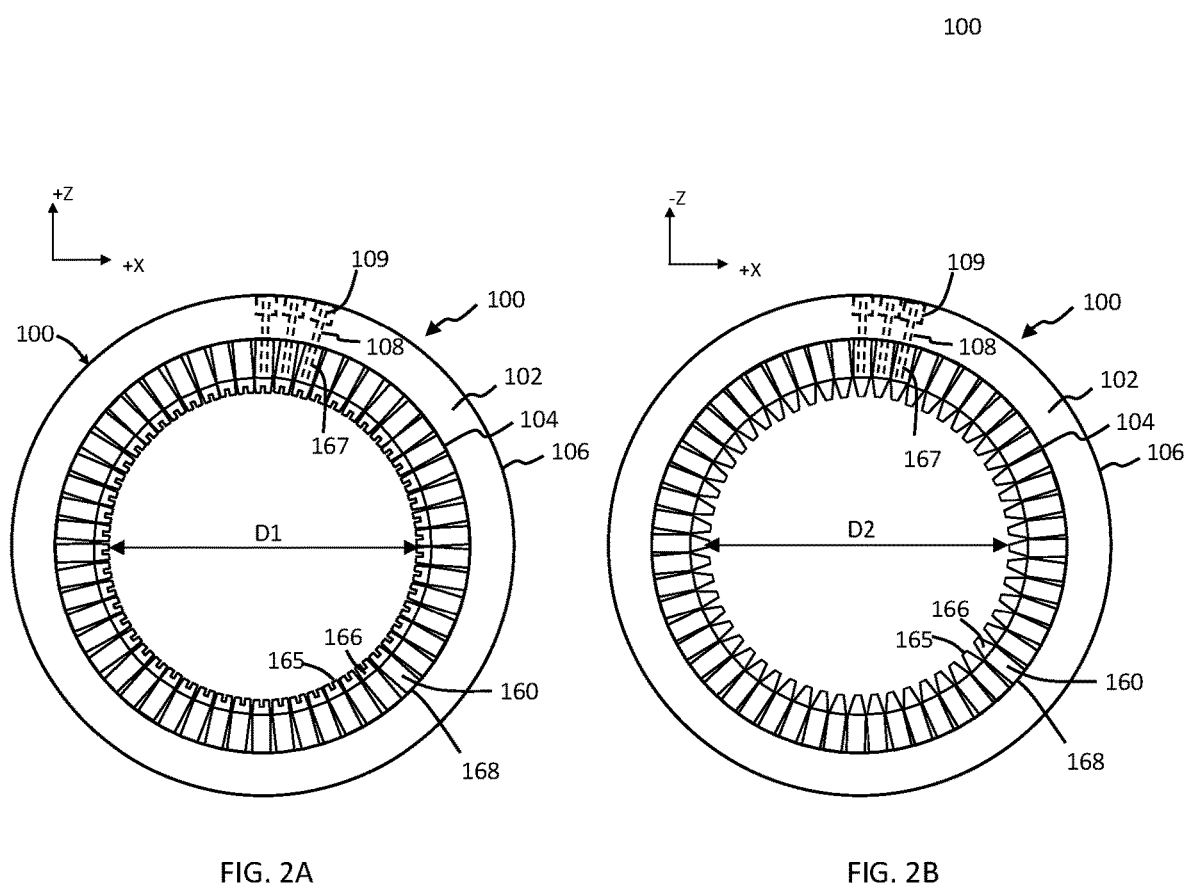
FIG. 2A is a schematic bottom view (+Y direction) of a pot for the pot broaching machine in FIG. 1.
FIG. 2B is a schematic top view (−Y direction) of a pot for the pot broaching machine in FIG. 1.

Referring now to FIGS. 2A and 2B, a schematic bottom view (+Y direction) and a schematic top view (−Y direction), respectively, of the pot 100 with the set of pot broaching tools 160 installed therein are shown. The set of pot broaching tools 160 are attached to an inner surface 104 of the cylindrical wall 102 such that an outer surface 165 of the cutting teeth 166 form a diameter of the hollow inner core 140 and a bottom side 168 of each of the pot broaching tools 160 is positioned adjacent the inner surface 104 of the cylindrical wall 102. In some aspects of the present disclosure, each of the set of pot broaching tools 160 is attached to the inner surface 104 using one or more threaded fasteners 109 (e.g., screws, bolts, etc.). In such aspects the cylindrical wall 102 has a set of apertures 108 extending from an outer surface 106 to the inner surface 104, each of the pot broaching tools 160 have at least one threaded aperture 167, and threaded fasteners 109 engage the threaded apertures 167 of the pot broaching tools 160 such that the pot broaching tools 160 are rigidly held against the inner surface 104 in a fixed position. The cutting teeth 166 of the set of pot broaching tools 160 provide an inner diameter D1 for the hollow inner core 140 at the first end 110 of the pot 100 and an inner diameter D2 for the hollow inner core 140 at the second end 120. As noted above, the inner diameter D2 is less than the inner diameter D1. Accordingly, as the pre-formed part 12 moves through the inner core 140 from the first end 110 to the second end 120, material is removed from the outer diameter portion 13 such that the formed part 14 is provided when the pre-formed part 12 reaches the second end 120. It should be understood that the tolerance of the inner diameter D1 and the inner diameter D2 is +/−0.002 inches. Accordingly, the tolerance of a height dimension (Z direction) between the outer surface 165 of the cutting teeth 166 and the bottom side 168 of the pot broaching tool is +/−0.002 inches.

Referring now to FIGS. 3A and 3B, a schematic side view and top view, respectively, of a pot broaching tool 160 are shown. The pot broaching tool 160 comprises a long narrow bar 162 (i.e., an elongated bar 162) with a first end 161 and a second end 163. A cutting side 164 comprising the set of cutting teeth 166 (i.e., a plurality of cutting teeth 166) and a bottom side 168 spaced apart from the cutting side 164 extend between the first end 161 and the second end 163 of the elongated bar 162. The set of threaded apertures 167 extend from the bottom side 168 into the elongated bar 162 along a height direction (Z direction). The elongated bar 162 has a height $h_{B1}$ between an outer surface 165 of a cutting tooth 166a at the first end 161 of the elongated bar 162 and the bottom side 168, and a height $h_{B2}$ between an outer surface 165 of a cutting tooth 166b at the second end 163 of the elongated bar 162 and the bottom side 168. As schematically depicted in FIG. 3A, the height $h_{B1}$ is greater than the height $h_{B2}$ such that the hollow inner core 140 decreases in diameter from D1 at the first end 110 of the pot to D2 at the second end 120 of the pot. In some aspects of the present disclosure, the height between the outer surface 165 of the cutting teeth 166 and the bottom side 168 increases by an incremental amount from the first end 161 to the second end 163. In one non-limiting example the height $h_{B1}$ between the outer surface 165 of the cutting tooth 166a at the first end 161 of the elongated bar 162 and the bottom side 168 is about 1.000 inches and the height $h_{B2}$ between the outer surface 165 of the cutting tooth 166b at the second end 163 of the elongated bar 162 and the bottom side 168 is about 1.062 inches. In such an example, the pot broaching tool 160 may have sixty-two (62) teeth between the first end 161 and the second end 163 and the height between the outer surface 165 of the cutting teeth 166 and the bottom side 168 incrementally increases by 0.001 inches. That is, the outer surface 165 of each cutting tooth 166 from the first end 161 to the second end 163 increases by a distance of 0.001 inches from the bottom side 168.

It should be understood that other incremental increases in height between outer surfaces of cutting teeth and the bottom side of a pot broaching tool are included in the teachings of the present disclosure. It should also be understood that more than one pot broaching tool 160 may be used to extend from the first end 110 to the second end 120 of the pot 100.

Figure 4A:
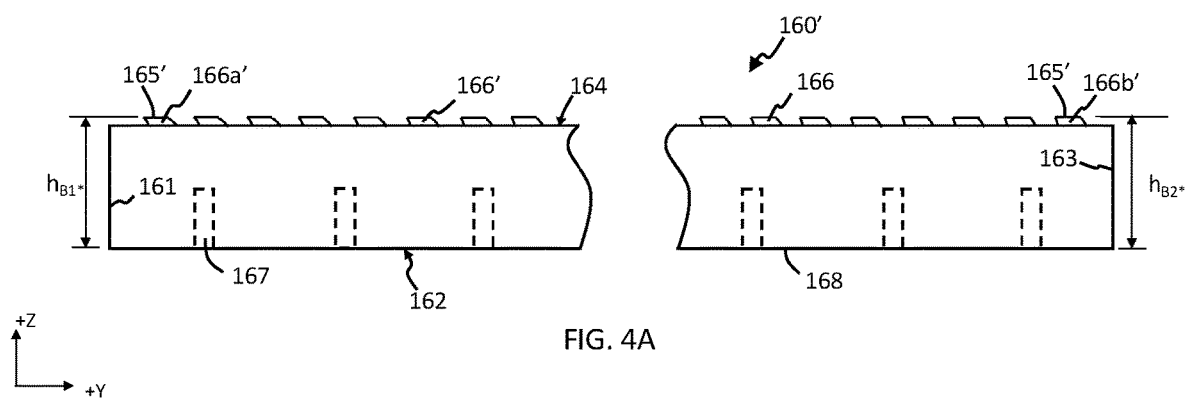
FIG. 4A is a schematic side view of the pot broaching tool in FIG. 3A after being used in a pot broaching machine.
Figure 4B:
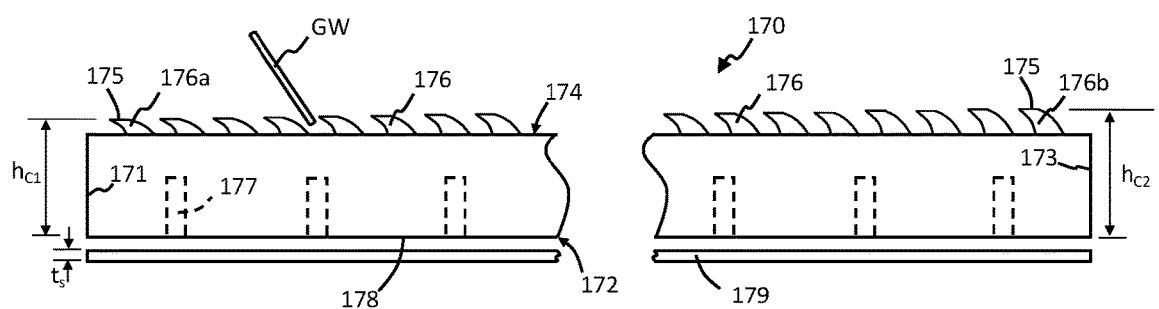
FIG. 4B is a schematic side view the worn pot broaching tool in FIG. 4A after being remanufactured and a polished shim used during installation of the remanufactured pot broaching tool in the pot in FIG. 1.

Referring now to FIGS. 4A and 4B, a worn or used pot broaching tool is schematically depicted in FIG. 4A and a remanufactured pot broaching tool used to replace the worn pot broaching tool is schematically depicted in FIG. 4B. Particularly, a worn pot broaching tool 160' with worn cutting teeth 166' is schematically depicted in FIG. 4A. Particularly, the height between an outer surface 165' of the cutting tooth 166a at the first end 161 of the elongated bar 162 and the bottom side 168 has been reduced to $h_{B1*}$ and the height between an outer surface 165' of the cutting tooth 166b at the second end 163 of the elongated bar 162 and the bottom side 168 has been reduced to $h_{B2*}$ (referred to herein collectively as "height $h_{B1*}$, $h_{B2*}$"). Also, the width (X direction) of the cutting teeth 166' may be reduced. Accordingly, the height between an outer surface 165' of the worn cutting teeth 166' and the bottom side 168 of the elongated bar 162 is reduced such that removal of material from an outer region 13 of the pre-formed part 12 (FIG. 1A) is reduced beyond tolerance levels and replacement of the worn pot broaching tool 160' is needed. According to known methods of remanufacturing pot broaching tools, the cutting teeth 166' of the worn pot broaching tool 160' are re-ground, e.g., with a grinding wheel GW, to form re-ground or remanufactured cutting teeth 176 (also referred to herein simply as "cutting teeth 176") as schematically depicted in FIG. 4B. Accordingly, a remanufactured pot broaching tool 170 with re-ground cutting teeth 176 is provided.

It should be understood that re-grinding the worn cutting teeth 166' results in a height $h_{C1}$ between an outer surface 175 of a cutting tooth 176a at a first end 171 of the remanufactured pot broaching tool 170 being less that the height $h_{B1}$ (FIG. 3A) and a height $h_{C2}$ between an outer surface 175 of a cutting tooth 176b at a second end 173 of the remanufactured pot broaching tool 170 being less that the height $h_{B2}$ (FIG. 3A). That is, the remanufactured pot broaching tool 170 has a reduced height $h_{C1}$, $h_{C2}$ compared to the height $h_{B1}$, $h_{B2}$ of the new pot broaching tool 160. In order to accommodate for the reduced height of the remanufactured pot broaching tool 170, a polished thin shim 179 is used or positioned between the bottom side 178 and the inner surface 104 of the cylindrical wall 102 (FIG. 1) during installation of the remanufactured pot broaching tool 170 in the pot 100. Accordingly, the polished thin shim 179 must be properly aligned and positioned between the bottom side 178 of the elongated bar 172 and the inner surface 104 of the cylindrical wall 102 while the remanufactured pot broaching tool 170 is installed (e.g., bolted) to the cylindrical wall 102. It should be understood that given the desired tolerance of the inner core diameters D1, D2 and the heights $h_{B1}$, $h_{B2}$, the polished thin shim 179 likewise has a high tolerance, e.g., within +0/−0.0002 inches and thus requires a flatness tolerance of +0/−0.0002 inches. As used herein, the phrase "flatness tolerance" refers to the tolerance or distance between the two closest parallel planes between which a surface lies.

It should be understood that forming the polished thin shim 179 with a flatness tolerance within +0/−0.0002 inches is a time consuming and costly process. Also, replacing a set of worn pot broaching tools 160' using one or more remanufactured pot broaching tools 170 and polished thin shims 179 requires more time than replacing the set of pot broaching tools 160' with new pot broaching tools 160. For example, an individual must align a remanufactured pot broaching tool 170 and a polished thin shim 179 simultaneously while inserting a threaded fastener 109 through a cylindrical wall aperture 108 and engaging a threaded aperture 177 of the remanufactured pot broaching tool 170. Misalignment and/or improper placement of the polished thin shim 179 may result in improper cutting of material from a pre-formed part 12 moving through the inner core 140 thereby requiring disassembly of the pot 100 to properly align the remanufactured pot broaching tool 170. Accordingly, more time for the replacement of the worn set of pot broaching tools 160' is required.

Figure 5A:
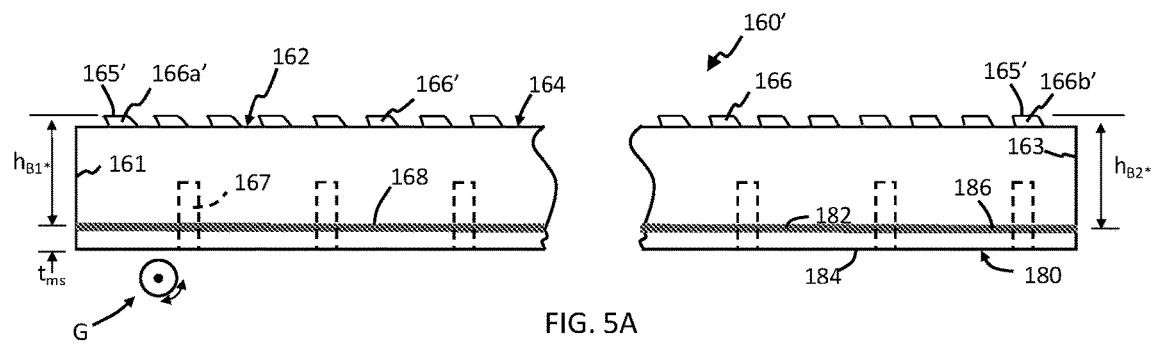
FIG. 5A is a schematic side view of the worn pot broaching tool in FIG. 4A with a milled shim cool laser welded to a bottom side of the worn pot broaching tool in accordance with the teachings of the present disclosure.
Figure 5B:
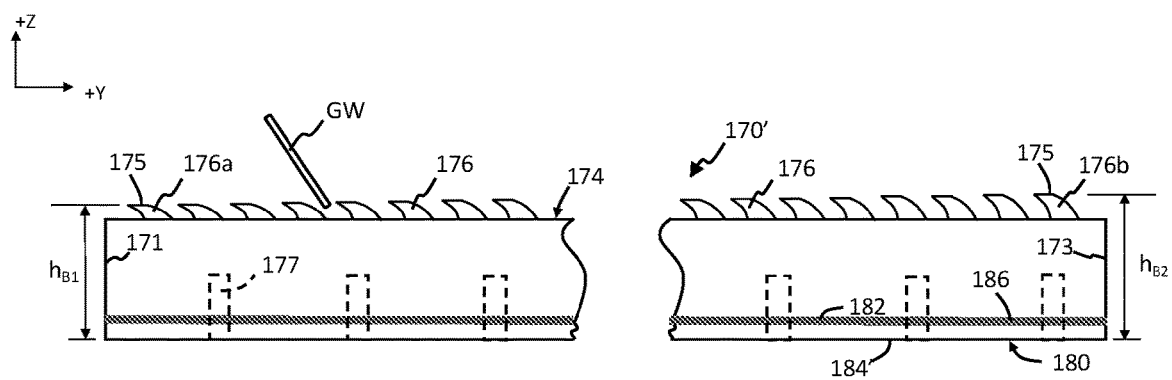
FIG. 5B is a schematic side view of the worn pot broaching tool in FIG. 4A after being remanufactured in accordance with the teachings of the present disclosure.

Referring now to FIGS. 5A-5B, a remanufactured pot broaching tool according to the teachings of the present disclosure is schematically depicted. Particularly, FIG. 5A schematically depicts the worn pot broaching tool 160' with a milled shim 180 cool laser welded to the bottom surface 168 of the elongated bar 162. As used herein the phrase "cool laser welded" or "cool laser welding" refers to laser welding with low power (e.g., less than 10 Watts) and is also referred to as laser assisted arc welding (LAAW). In some aspects of the present disclosure, the cool laser welding process uses a filler metal to bond the milled shim 180 to the bottom surface of the elongated bar 162.

The milled shim 180 may be a rough milled shim with an Ra surface finish between 250 to 30 microinches (μin) and has an inner surface 182 positioned adjacent to the bottom surface 168 of the elongated bar 162. In some aspects of the present disclosure, the inner surface 182 is in contact with the bottom surface 168 of the elongated bar 162. The milled shim 180 has an outer surface 184 and thickness $t_{ms}$ between the inner surface 182 and the outer surface 184. Also, a grinder G may be used to grind the outer surface 184 such that a flat outer surface 184' is formed. The flat outer surface 184' may serve as reference surface for additional machining and/or grinding operations of the worn pot broaching tool 160'. In some aspects of the present disclosure the outer surface 184 is ground flat to within +/−0.0010 inches. In such aspects the outer surface 184 may be ground flat to within +0/−0.0002 inches. That is, the flat outer surface 184' has a flatness tolerance within +0/−0.0002 inches.

Referring particularly to FIG. 5B, the cutting teeth 166' of the worn pot broaching tool 160' (FIG. 5A) are re-ground with a grinding wheel GW such that a remanufactured pot broaching tool 170' with cutting teeth 176 is provided. It should be understood that the flat outer surface 184' of the milled shim 180 provides a flat surface (e.g., a reference surface) for positioning and clamping the worn pot broaching tool 160' such that the worn cutting teeth 166' can be re-ground to from cutting teeth 176. Also, the flat outer surface 184' allows the remanufactured pot broaching tool 170' to have the same height $h_{B1}$, $h_{B2}$ as the new pot broaching tool 160 (FIG. 3A) within a tolerance of +0/−0.0002 inches. Accordingly, the remanufactured pot broaching tool 170' may be handled and attached within the pot 100 as a single piece/component without alignment and positioning of a polished shim 179.

It should be understood that grinding the milled shim 180 cool laser welded to the bottom side 168 of the elongated bar 162 in order to produce a shim that accommodates for the reduced height of the elongated bar 162 requires less time and cost than producing the polished shim 179. That is, cool laser welding a milled shim 180 to the bottom side 168 of the elongated bar 162 and then grinding the milled shim 180 to provide a thin shim attached to the elongated bar 162 requires less time and cost than producing a polished shim 179. It should also be understood that installing a remanufactured pot broaching tool 170' instead of a remanufactured pot broaching tool 170 using the polished shim 179 saves time and cost. Accordingly, production of a remanufactured pot broaching tool 170' in accordance with the teachings of the present disclosure requires less time and cost than production of a remanufactured pot broaching tool 170 and a polished shim 179, and installation of the remanufactured pot broaching tool 170' requires less time and cost than installation of the remanufactured pot broaching tool 170 using the thin shim 179.

Figure 6:
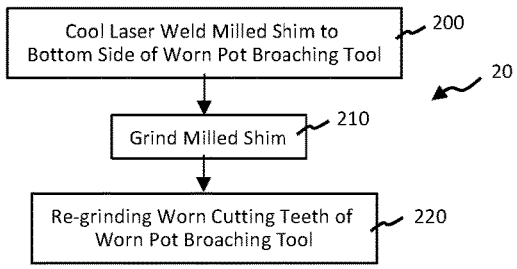
FIG. 6 is a flow chart of a process for remanufacturing a pot broaching tool in accordance with the teachings of the present disclosure.

Referring now to FIG. 6, a flow chart for a method 20 of remanufacturing a pot broaching tool according to the teachings of the present disclosure is shown. The method 20 includes cool laser welding a milled shim to a bottom side of a worn pot broaching tool (FIG. 5A) at step 200 and grinding the milled shim at step 210 such that a flat surface is provided. The worn cutting teeth of the worn pot broaching tool with the milled shim cool laser welded thereto are re-ground at step 220 such that a remanufactured pot broaching tool is provided. An outer surface of the milled shim that has been laser welded to the worn pot broaching tool and ground has a flatness tolerance within +/−0.0010 inches, e.g., a flatness tolerance within +0/−0.0002 inches. Also, the outer surface of the milled shim serves as a flat reference surface for positioning and clamping the worn pot broaching tool such that the worn cutting teeth can be re-ground and remanufactured cutting teeth provided.

Figure 7:
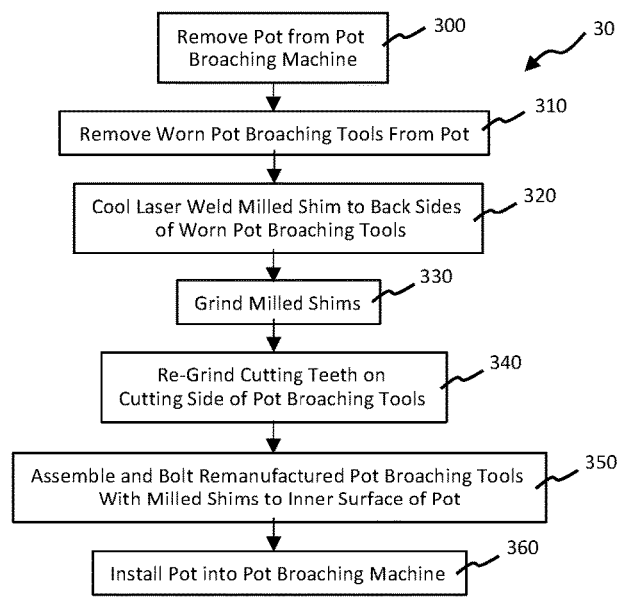
FIG. 7 is a flow chart of a process for replacing a pot in a pot broaching machining in accordance with the teachings of the present disclosure.

Referring now to FIG. 7, a method 30 for replacing a pot in a pot broaching machine according to the teachings of the present disclosure is schematically depicted. The method 30 includes removing the pot from the pot broaching machine at step 300. The pot has a set of worn or used pot broaching tools. The set of worn pot broaching tools are removed from the pot at step 310 and milled shims are cool laser welded to back sides of the worn pot broaching tools at step 320. Outer surfaces of the milled shims that have been cool laser welded to the worn pot broaching tools are ground at step 330 and the ground outer surfaces provided flat reference surfaces for positioning and clamping the worn pot broaching tools such that worn cutting teeth can be re-ground at step 340 and remanufactured cutting teeth provided. The set of remanufactured pot broaching tools are assembled and bolted to an inner surface of the pot 100 at step 350 and the pot with the set of remanufactured pot broaching tools is installed in the pot broaching machine 10 at step 360.

It should be understood that assembling and bolting the set of remanufactured pot broaching tools within the pot without the use of thin shims reduces the time and cost to replace the pot. For example, assembling and bolting the set of remanufactured pot broaching tools within the pot without the use of thin shims reduces the time and cost to replace the pot 100 by at least 50% (compared to using remanufactured pot broaching tools and thin shims). In some aspects of the present disclosure, assembling and bolting the set of remanufactured pot broaching tools within the pot without the use of thin shims reduces the time and cost to replace the pot by at least 60%, for example, by at least 70% or by at least 80%.

In some aspects of the present disclosure, a combination of new pot broaching tools and remanufactured pot broaching tools are assembled and bolted to the inner surface of the pot. However, using remanufactured pot broaching tools constructed in accordance with the teachings of the present disclosure, in combination with new pot broaching tools, reduces the time and cost to replace the pot compared to using remanufactured pot broaching tools and thin shims.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:
   re-grinding cutting teeth on a cutting side of a used pot broaching tool;
   cool laser welding a rough milled shim to a bottom side of the used pot broaching tool; and
   grinding the cool laser welded rough milled shim such that an outer surface of the cool laser welded rough milled shim has a high polished surface and a remanufactured pot broaching tool is formed.

2. The method according to claim 1, wherein the outer surface of the cool laser welded rough milled shim has a flatness tolerance within +0/−0.0002 inches.

3. The method according to claim 1, wherein an inner surface of the rough milled shim has an Ra surface finish between 250 and 30 μin.

4. The method according to claim 1, wherein the cool laser welded rough milled shim has a thickness between 0.0625 inches and 0.500 inches.

5. The method according to claim 1 further comprising removing the used pot broaching tool from a pot of a pot broaching machine before forming the remanufactured pot broaching tool.

6. The method according to claim 1 further comprising installing the remanufactured pot broaching tool to a pot of a pot broaching machine without the use of a thin shim between the outer surface of the cool laser welded rough milled shim and an inner surface of the pot.

7. A method comprising:
replacing a first set of pot broaching tools removed from a pot of a pot broaching machine with a second set of pot broaching tools, wherein the second set of pot broaching tools comprise at least one remanufactured pot broaching tool, the at least one remanufactured pot broaching tool formed by re-grinding cutting teeth on a cutting side of a used pot broaching tool, cool laser welding a rough milled shim to a bottom side of the used pot broaching tool, and grinding the cool laser welded rough milled shim such that an outer surface of the cool laser welded milled shim has a high polished surface.

8. The method according to claim 7, wherein the outer surface of the cool laser welded rough milled shim has a flatness tolerance within +0/−0.0002 inches.

9. The method according to claim 7, wherein an inner surface of the rough milled shim has an Ra surface finish between 250 and 30 μin.

10. The method according to claim 7, wherein the cool laser welded rough milled shim has a thickness between 0.0625 inches and 0.500 inches.

11. The method according to claim 7, wherein the at least one remanufactured pot broaching tool is installed to the pot without the use of a thin shim between the outer surface of the cool laser welded milled shim and an inner surface of the pot.

12. The method according to claim 7, wherein the first set of pot broaching tools comprises a set of used pot broaching tools.

13. The method according to claim 12, wherein each of the set of used pot broaching tools is formed into a remanufactured pot broaching tool by re-grinding cutting teeth on a cutting side of a used pot broaching tool, cool laser welding a rough milled shim to a bottom side of the used pot broaching tool, and grinding the cool laser welded rough milled shim such that an outer surface of the cool laser welded milled shim has a high polished surface such that a set of remanufactured pot broaching tools is formed.

14. The method according to claim 12, wherein each of the set of remanufactured pot broaching tools is installed to an inner surface of the pot without the use of a thin shim between the outer surface of the cool laser welded milled shim and the inner surface of the pot.

15. A method for replacing pot broaching tools in a pot broaching machine, the method comprising:
removing a pot containing a set of broaching tools from a pot broaching machine;
replacing a first set of pot broaching tools from the pot with a second set of pot broaching tools, wherein the second set of pot broaching tools comprise at least one remanufactured pot broaching tool, the at least one remanufactured pot broaching tool formed by re-grinding cutting teeth on a cutting side of a used pot broaching tool, cool laser welding a rough milled shim to a bottom side of the used pot broaching tool, and grinding the cool laser welded rough milled shim such that an outer surface of the cool laser welded milled shim has a high polished surface; and
re-installing the pot into the pot broaching machine.

16. The method according to claim 15, wherein the at least one remanufactured pot broaching tool is installed within the pot without the use of a thin shim between the rough milled shim cool laser welded to the bottom side of the pot broaching tool and an inner surface of the pot.

17. The method according to claim 15, wherein the at least one remanufactured pot broaching tool comprises a set of remanufactured pot broaching tools and the set of remanufactured pot broaching tools are installed within the pot without the use of thin shims between the rough milled shims cool laser welded to the bottom sides of the set of pot broaching tools and an inner surface of the pot.

18. The method according to claim 17, wherein a time to replace the first set of pot broaching tools with the second set of pot broaching tools using the set of remanufactured pot broaching tools without the use of thins shims is reduced by at least 50% compared to replacing the first set of pot broaching tools with remanufactured pot broaching tools and thin shims between the remanufactured pot broaching tools and the inner surface of the pot.

19. The method of claim 15, wherein the at least one remanufactured pot broaching tool has a tolerance of a height dimension between an outer surface of the cutting teeth and an elongated outer surface of the cool laser welded rough milled shim within +0/−0.0002 inches.

20. The method of claim 15, wherein the rough milled shim comprises a milled inner surface in contact with the bottom side of the used pot broaching tool.

* * * * *